United States Patent [19]

Bloomer et al.

[11] 4,300,392
[45] Nov. 17, 1981

[54] INTERCHANGEABLE NETWORKS WITH NON-LINEAR SENSORS AND METHOD OF PRODUCING SUCH NETWORKS

[75] Inventors: Milton D. Bloomer; John D. Harnden, Jr.; Denise A. Deallenbach, all of Schenectady, N.Y.

[73] Assignee: General Electric Company, Schenectady, N.Y.

[21] Appl. No.: 121,488

[22] Filed: Feb. 14, 1980

[51] Int. Cl.³ .............................................. G01K 7/24
[52] U.S. Cl. .................................. 73/362 AR; 73/342
[58] Field of Search ........................... 73/362 AR, 342

[56] References Cited

U.S. PATENT DOCUMENTS

| | | | |
|---|---|---|---|
| 3,665,766 | 5/1972 | Johnston | 73/342 |
| 4,060,715 | 11/1977 | Scott | 73/362 AR |
| 4,148,220 | 4/1979 | Spofford | 73/362 AR |

Primary Examiner—Donald O. Woodiel
Attorney, Agent, or Firm—Geoffrey H. Krauss; James C. Davis; Marvin Snyder

[57] ABSTRACT

Highly linearized and interchangeable networks, each having at least one non-linear resistive element for sensing the magnitude of a physical parameter, such as a thermistor for measuring temperature, have a specified network resistance at a particular value of sensed parameter within a desired sensed parameter range, and also have a predetermined resistance-versus-sensed-parameter slope. The network includes at least one fixed resistor for each resistive sensing element.

11 Claims, 13 Drawing Figures

INTERCHANGEABLE NETWORKS WITH NON-LINEAR SENSORS AND METHOD OF PRODUCING SUCH NETWORKS

BACKGROUND OF THE INVENTION

The present invention relates to networks having an electrical resistance changing with the magnitude of a sensed parameter and, more particularly, to novel interchangeable, linearized sensor networks using non-linear sensors and for methods for producing such networks.

Sensors which provide, between a pair of sensor terminals, an electrical resistance of magnitude changing with the magnitude of a sensed parameter, are well known. In many of these sensors a highly non-linear relationship exists between the magnitude of the sensor resistance and the sensed parameter magnitude, whereby relatively expensive linearizing networks are not only required between the sensor network and a linear display, but, if the sensor is to provide a linear output, the sensor must provide a slope and a specific value of resistance at a particular sensed parameter magnitude, which characteristics are exceedingly difficult and expensive to obtain. Lack of these output characteristics results in a low degree of interchangeability between different sensor networks of the same type.

In particular, it is well known that of various temperature sensing means, a potentially low-cost temperature sensor may be fabricated from that group of thermally-sensitive semiconductors collectively known as thermistors. A thermistor, usually manufactured from oxides of the iron group of transition elements (such as chromium, magnesium, iron, cobalt, nickel and uranium) which has been doped with ions of differing valance, classically exhibits an exponentially decreasing resistance with increasing temperature. The resulting large negative temperature coefficient (NTC) makes a thermistor an extremely attractive device for use as a temperature sensor. However, the extreme non-linearity of the exponential function complicates applications of the device. Positive temperature coefficient (PTC) thermistors are also known, which are more nearly linear, but have greatly reduced temperature coefficients compared to the NTC thermistors.

Thermistors and other sensors providing a terminal resistance varying with the magnitude of a sensed parameter, are particularly desirable for applications which require sensors which are not only low cost but also highly interchangeable. Interchangeability requires that the sensor network have: a particular value of terminal resistance (i.e. point resistance) for a selected value of sensed parameter magnitude; a desired slope in the resistance-versus-sensed parameter relationship; and a high degree of linearity. Thus, any one of a multiplicity of sensors of similar design can be interchanged with any other one of that group of sensors and still provide a substantial degree of accuracy without additional adjustment.

Accordingly, networks having an electrical resistance changing with the magnitude of a sensed parameter in a highly linear manner and with slope and point resistance easily established, are highly desirable.

BRIEF SUMMARY OF THE INVENTION

In accordance with the invention, apparatus having an electrical resistance linearly responsive to changes in the magnitude of a sensed parameter, comprises: sensing means for providing an electrical resistance having a non-linear relationship to the magnitude of the sensed parameter; an electrical resistance of fixed magnitude, in electrical series connection with each associated one of the sensing means; all sensor-series resistance branches connected in parallel; first network terminal means connected to that one of the first and second sensor terminals not connected to the associated series electrical resistance; a first fixed resistance in parallel with the paralleled branches; all of the remaining terminals of the associated series resistors connected in series with a second fixed resistance; and second network terminal means to which the remaining end of the second fixed resistance is connected.

In one presently preferred embodiment, a single sensor has a first fixed resistance in series therewith, with a second fixed resistance in electrical parallel connection across the first fixed resistance-sensing element series branch and with a third fixed resistance in series with the parallel pair of branches thus formed. The value of each of the three fixed resistances is uniquely determined by the desired slope of the terminal-resistance, versus sensed-parameter-magnitude curve, and the desired magnitude of point resistance at a specific value of the sensed parameter, to achieve the condition of greatest linearity for the network. A multiple sensor network, having the same three criteria of maximum linearity, desired slope and desired point resistance, utilizes an electrical series resistance in series with each of the plurality of sensors with each of the series-resistance-sensor branches being paralleled with a fixed value resistance and the entire paralleled group of branch circuits in series with another fixed value resistance, for a total of (N+2) fixed resistances in a sensor network utilizing N non-linear resistance sensors. The resistance in series with one of the multiplicity of sensors may be reduced to substantially zero magnitude, with some degradation of linearity.

In our presently preferred embodiments, the resistance sensors are thermistors, providing typical network linearities of ±0.5% over an extended temperature ranges while providing a desired resistance at a particular temperature, within the range, and a desired resistance-temperature slope for the network terminal resistance.

Accordingly, it is the object of the present invention to provide a novel method for producing interchangeable networks, each having at least one non-linear sensing element.

It is another object of the present invention to provide a novel network having a highly linear response but using at least one non-linear sensing element.

These and other objects of the present invention will become apparent upon consideration of the following detailed description, taken in conjunction with the drawings.

BRIEF DESCRIPTION OF THE DRAWINGS

FIG. 1b is a graph illustrating the relationship between the terminal resistance and the sensed parameter in the sensor FIG. 1a;

FIGS. 2b and 3b are graphs illustrating the relationship between terminal resistance and sense parameter for the respective linearizing networks of FIGS. 2a and 3a;

DETAILED DESCRIPTION OF THE INVENTION

Figure 1A:
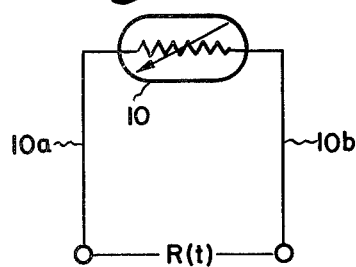
FIG. 1a is a prior art non-linear sensing element.

A number of parameter sensors 10 are known which are two-terminal devices having a resistance R appearing between the terminals thereof, with a magnitude dependent upon the magnitude of a physical parameter sensed by sensor 10. While such variable-resistance sensors are known for sensing parameters such as humidity, pressure and the like, a variable-resistance temperature sensor, such as a negative-temperature-coefficient (NTC) thermistor, will be utilized in the description of the following preferred embodiments. The thermistor 10, of FIG. 1a, has a pair of terminals 10a and 10b between which terminals a resistance R (t) is measurable.

Figure 1B:
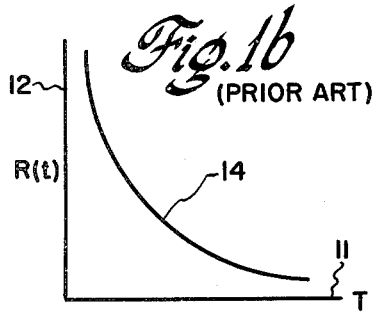

As shown in FIG. 1b, wherein absolute temperature T is plotted along abscissa 11 and terminal resistance R (t) is plotted along ordinate 12, NTC thermistor 10 has an exponentially decreasing resistance-versus-temperature curve 14, i.e. the NTC thermistor has a relatively high resistance for lower temperatures, which resistance decreases as the temperature increases. The terminal resistance is generally given by the formula $R(t) = Ae^{(b/T)}$, where A is a geometric parameter, e is the natural logarithm base, b is related to the properties of the material from which the thermistor is constructed, and T is absolute temperature (in degrees Kelvin). The geometric parameter A can be varied, as by trimming the physical dimensions of the temperature-sensitive resistance material of the thermistor, to give a desired terminal resistance at a single temperature, i.e. to set $R(T_1) = k$, where $T_1$ is the desired absolute temperature and k is a desired fixed resistance value. The material properties constant b is established by the particular temperature-sensitive resistance material utilized and the process utilized for preparation thereof; once a batch of thermistor material is mixed, the value of the material property parameter b is established. It will be seen that value of material property parameter b establishes the ratio of resistances of a particular thermistor when measured at two different temperatures. Typically, the process-dependent material property parameter b can be established with a tolerance of about ±5% (with a best tolerance of about ±1.3%) and cannot be trimmed after the thermistor is manufactured. Typically, by trimming the geometric parameter A, during manufacturing, a terminal resistance tolerance of between about ±0.8% to about ±10% can be achieved. It should be understood that the better the tolerance on terminal resistance, at a single temperature $T_1$, the more costly the manufacturing of a thermistor. It will also be seen that the highly non-linear resistance-versus-temperature characteristic of thermistor 10 does not easily lend itself to providing simplified parameter measuring circuits, as a linearizing network of relatively great complexity must be utilized between the sensor and a linear-responding display.

Figure 2A:
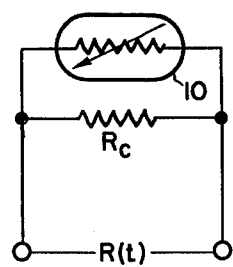
FIGS. 2a and 3a are prior art linearizing networks, usable over relatively narrow ranges of sensed parameter, for non-linear sensors.
Figure 3A:
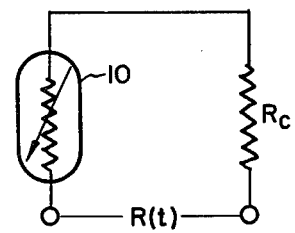
Figure 2B:
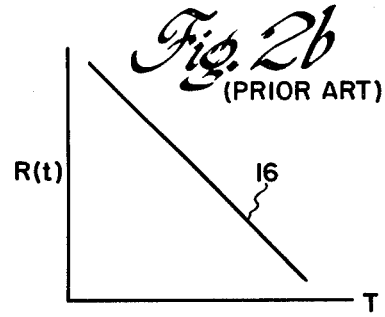
Figure 3B:
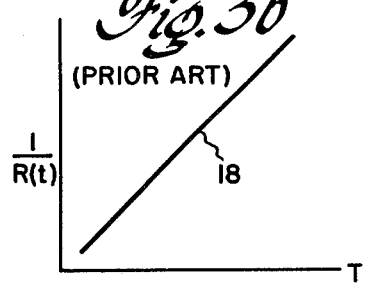

Many attempts have been made in the prior art to provide a linear terminal-resistance versus sensed-parameter relationship for a non-linear sensor 10 (such as a thermistor). It is well known that a thermistor can be made relatively linear, within a few percent, over a given temperature range by combining thermistor 10 with a single resistor $R_c$, with the linearizing resistance being placed in parallel with the sensor (FIG. 2a) when a linear network resistance-versus-temperature curve 16 is desired (FIG. 2b). The linearizing resistance $R_c$ may be placed in series with thermistor 10 (FIG. 3a) when a linearized relationship between the network terminal conductance (1/R(t)) and temperature, as in curve 18 (FIG. 3b), is desired. It is well known that the value of linearizing resistance $R_c$ is given by the formula $$R_c = R(T_M)(b - 2(T_M))/(b + 2(T_M)),$$

where $R(T_M)$ is the resistance of thermistor 10 at a temperature $T_M$ in the middle of a temperature range bounded by a highest range temperature $T_H$ and by a lowest range temperature $T_L$. The temperature range, from high temperature $T_H$ to low temperature $T_L$, is relatively small. In addition, the linearized sensor networks so formed are not interchangeable; the variation in sensor resistance at a given temperature and the variation in slope due to the tolerance on the material property parameter b cause relatively large errors to be present when interchanging members of a group of the same network, with each member network having a thermistor 10 and a linearizing resistance $R_c$ (with a fixed value of resistance $R_c$ being utilized, as determined by the average values of parameters A and b for the particular type of thermistor 10 selected for the networks). As previously stated, parameter b is due to the materials and processes utilized in forming the sensor and relatively little can be done to reduce the variations in parameter b, even if relatively high thermistor cost can be tolerated. Most expensive thermistors will generally have processing only of geometric parameter A, as by physically grinding or laser trimming of the device dimensions to yield a particular resistance at a single temperature. Thus, the linearized network may have a wide range of terminal resistance at a particular temperature and will have a resistance-versus-temperature slope varying over a wide range on a network-to-network basis.

Figure 4A:
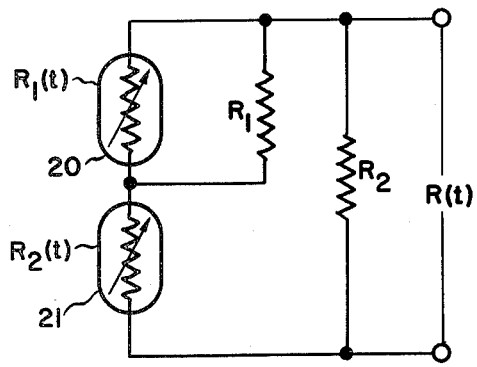
FIGS. 4a–4d are prior art sensing networks having a plurality of sensing elements.

Referring now to FIGS. 4a–4d, an extended-temperature-range passive sensor network may utilize more than one sensing element. In the prior art embodiments shown, a pair of thermistor temperature sensing elements 20 and 21 are utilized. In FIG. 4a, first thermistor 20 has a temperature-dependent resistance $R_1$ (t) and is in electrical parallel connection with a fixed resistance $R_1$; a second temperature-sensing thermistor 21 has a temperature-dependent resistance $R_2$ (t) and is in electrical series connection with the paralleled combination of resistor $R_1$ and thermistor 20. A second fixed resistance $R_2$ is in electrical parallel connection with the network of thermistors 20 and 21 and fixed resistance $R_1$. If resistance $R_1$ is chosen to linearize the non-linear resistance of first thermistor 20, the series addition of second thermistor 21 results in a non-linear temperature-dependent resistance in parallel with fixed resistor $R_2$. Resistor $R_2$ may be chosen to linearize the resulting non-linear resistance of the network branch containing the two thermistors and resistance $R_1$.

Figure 4C:
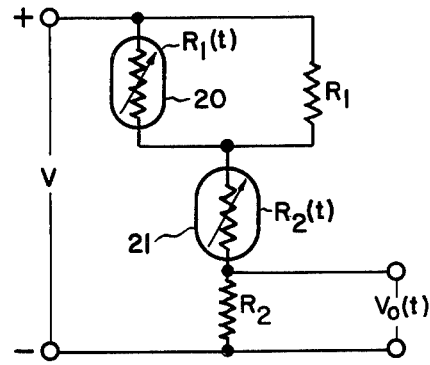
Figure 4B:
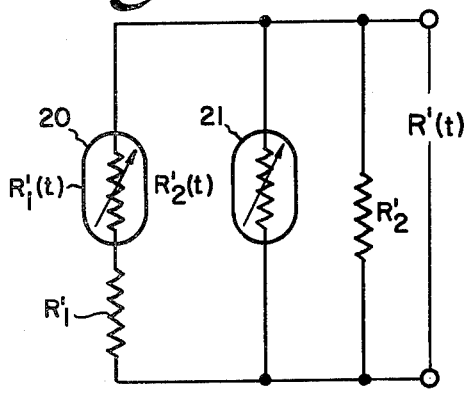

In FIG. 4b, a set of Thevenin-Norton transformations have been utilized so that first thermistor 20, having a transformed resistance $R_1'(t)$, is in electrical series connection with the first fixed resistance $R_1'$, while second thermistor 20 has a transformed resistance $R_2'(t)$ and is in electrical parallel connection across the first sensor-first resistance branch and also the second fixed resistance $R_2'$ branch. In this equivalent network, the value of $R_1'$ is chosen to linearize the conductance of the first sensor 20 branch, while the value of second fixed resistance $R_2'$ was chosen to linearize the total non-linear resistance of remainder of the circuit, whereby the terminal resistance (R'(t) is linear with respect to temperature.

Figure 4D:
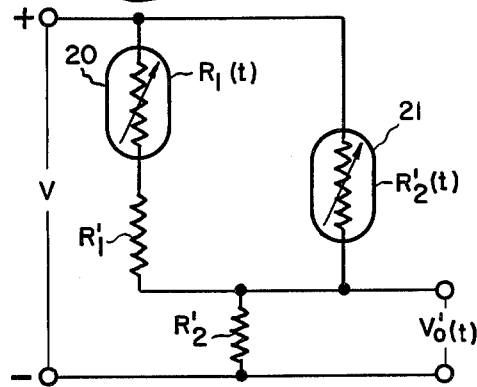

In the prior art circuits of FIGS. 4c and 4d, it is desired to have an output voltage $V_o(t)$ or $V_o'(t)$, respectively, which is derived from a fixed potential, of magnitude V, and which output voltage (rather than terminal resistance) varies with the sensed parameter, e.g. temperature. The output voltage appears across fixed resistance $R_2$ which is an electrical series connection with the sensor network having a pair of thermistor sensors 20 and 21 across the fixed voltage V. In FIG. 4c, the pair of sensors are in electrical series connection, with a first fixed resistance $R_1$ across first sensor 20. In the electrical-analog circuit of FIG. 4d, the first sensor 20 is in electrical series connection with equivalent first fixed resistance $R_1'$, and with the first fixed resistance-first sensor branch in electrical parallel connection with the second sensor 21. While the values of resistors $R_1$ and $R_2$, or $R_1'$ and $R_2'$, can be adjusted for substantially linear resistance-versus-temperature operation in the networks of FIGS. 4a and 4b, or for substantially linear output voltage-versus-temperature operation in the circuits of FIGS. 4c and 4d, these multiple-sensor networks have the same shortcomings as the single-sensor networks of FIGS. 2a and 3a, e.g. if a multiplicity of the same network are produced, interchangeably between any two networks may be achieved if relatively expensive, closely matched sensors are utilized, but interchangeability between member networks of the multiplicity, using relatively inexpensive unmatched sensors, is not achieved because the networks may all have differing degrees of linearity, the specific terminal resistance (or output voltage) of each, at a specified value of sensed parameter (e.g. at a specified temperature) will not be identical to the terminal resistance (or output voltage) of another network of the multiplicity, at the same temperature; and the resistance (or output voltage)-versus-temperature slope of one sensor network will not necessarily be identical to the slope of any of the other sensor networks of that type. This precludes providing low cost networks, using non-linear sensors, which are fully interchangeable in terms of linearity, slope and resistance value at a specified value of the sensed parameter.

Figure 5:
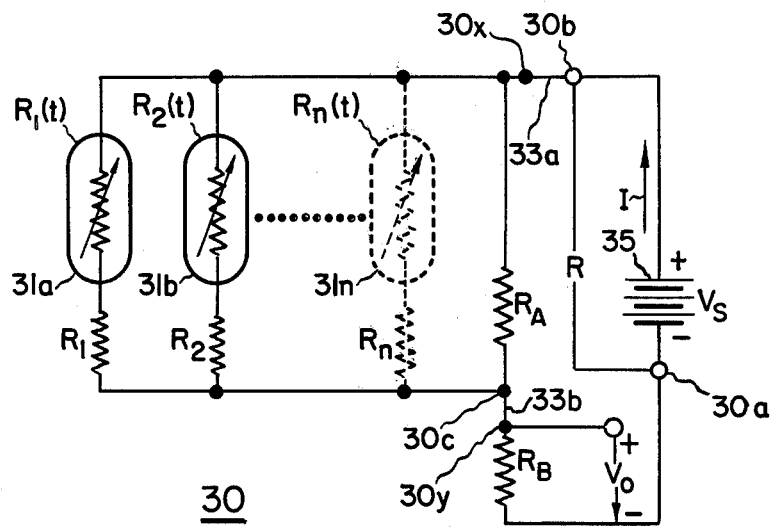
FIG. 5 is a sensing element network in accordance with the principles of the present invention.

Referring now to FIG. 5, we have found that a network 30 may be fully interchangeable with respect to all three criteria (linearity, slope and point value) even using non-linear sensors. Network 30 contains a plurality 31a–31n of non-linear resistive sensors, each respectively having a resistance $R_1(P)$, $R_2(P)$, ..., $R_n(P)$, as a function of the sensed parameter P. Each of the sensor resistances is of the form $R = Ae^{(b/P)}$, where A, b and P are as previously defined hereinabove. An associated fixed value of resistance $R_1, R_2, \ldots R_n$ is in series electrical connection with the associated (like subscripted) sensor 31a–31n. Each of the sensor-series-resistance branches is in electrical parallel connection with all other sensor-series-resistance branches, and also with a fixed value resistor of resistance $R_A$. The (n+1) paralleled branches are then connected in electrical series connection with another fixed resistor of resistance value $R_B$. The terminal of resistance $R_B$ which is not connected to the sensor-series-resistance branches is one terminal 30a of the network, while the paralleled terminals of the sensor-series-resistance branches furthest from resistance $R_B$ are the second terminal 30b of the interchangeable, linearized sensor network 30. Either the total conductance or the total resistance between network terminals 30a and 30b can be made highly linear with respect to the sensed parameter. If a highly linear terminal conductance network is utilized, the output voltage $V_o$, across resistance $R_B$, or a current I flowing through the network (if the terminals, 30a and 30b are connected to a voltage source 35 of constant magnitude $V_s$) is also highly linear with changes in sensed parameter. By selecting the proper values of linearizing resistances $R_1 - R_n$, $R_A$ and $R_B$, a specific value of terminal resistance R or terminal conductance G (=1/R) may be obtained at a specific temperature within the temperature range of the sensor network, and a specific value of resistance-versus-temperature slope, or conductance-versus-temperature slope, is simultaneously obtainable. Network 30 is thus of a fully interchangeable type even if relatively low cost and substantially non-matched sensors are used. It should also be understood that network 30 may be partitioned to have a portion thereof at a first physical location (e.g. the thermistors 31a–31n and resistors $R_1 - R_n$ and $R_a$ at the location where temperature is to be sensed) and the remainder of the network at another location remote from the first location (e.g. resistor $R_B$ adjacent to apparatus measuring output voltage $V_0$). The effect of capacitance between a pair of wires 33a and 33b (connecting remote network terminals 30x and 30c, respectively, to terminals 30b and 30y) is reduced, as the time constant of the wiring capacitance and the resistance of the associated portion of the network is typically much less than the time constant of the entire network and measurement apparatus.

Figure 6A:
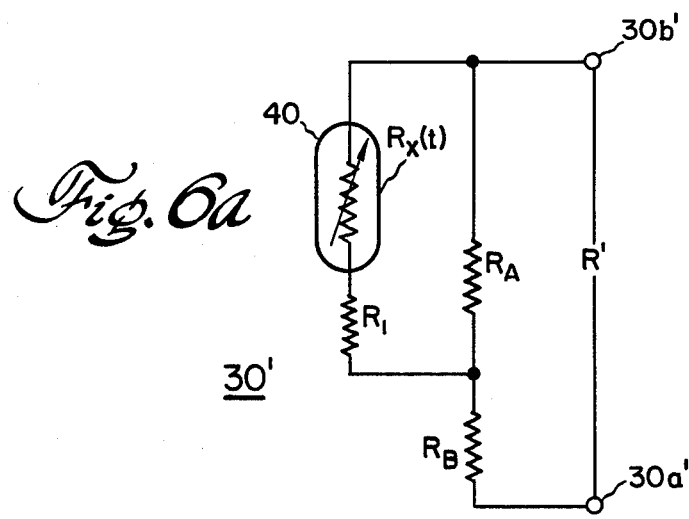
FIG. 6a is a linearized sensing network, in accordance with the principles of the present invention, having a single sensing element.
Figure 6B:
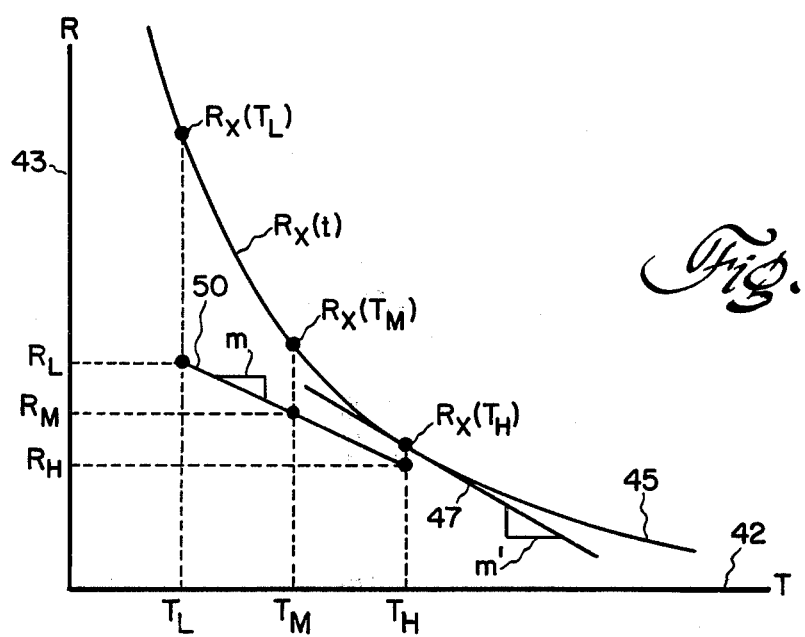
FIG. 6b is a graph illustrating the non-linear terminal resistance of the sensor, and the highly linear terminal resistance of the network of FIG. 6a, with respect to the sensed parameter (temperature).

In FIG. 6a, a linear resistance network 30' is the special case for n=1, i.e. a sensor network utilizing a single non-linear sensor 40, having a resistance $R_x(P)$ with respect to the measured parameter P over a prescribed parameter (e.g. temperature) range from a lower parameter limit $P_L$ (e.g. lower temperature $T_L$) to a higher parameter limit $P_H$ (e.g. higher temperature limit $T_H$). As shown in FIG. 6b, wherein absolute temperature T is plotted along abcissa 42 and resistance is plotted along ordinate 43, sensor 40 has a resistance $R_x(t)$ curve 45, established by the sensor mid-temperature resistance $R_x(T_M)$ at temperature $T_M$ and by the lower temperature resistance $R_x(T_L)$ at temperature $T_L$ and higher temperature resistance $R_x(T_H)$ at temperature $T_H$. The exponential curve 45 yields a value for the material property parameter b, for a chosen sensor 40, as $$b = (1/T_M - 1/T_H)^{-1} \ln (R_x(T_M)/R_x(T_H)).$$

The terminal resistance R' between terminals 30a' and 30b' is given by the formula $$R' = R_B + R_A(R_1 + R_x(t))/(R_A + R_1 + R_x(t)).$$

It is desired to have the terminal resistance R' follow a straight line 50 (FIG. 6b); i.e. have a high degree of linearity, such that the slope m of curve 50 is to be essentially constant, while establishing the value of slope m at a desired value, and providing a specific resistance, e.g. resistance magnitude $R_M$, at a specific temperature within the range, e.g. temperature $T_M$. The slope m must be less than the minimum slope m' of sensor curve 45,—over the temperature range of interest, e.g. minimum slope m' given by line 47 tangent to curve 45 at the highest temperature $T_H$ of interest. The specific resistance value $R_M$ at the specified temperature $T_M$ is varied by variation of resistance $R_B$, but with contribution of the total terminal resistance being made by resistances $R_A$, $R_1$ and $R_x(t)$.

Thus, to establish a specific resistance $R_M$ point at a selected temperature $T_M$, a first equation $$R_M = R_B + R_A(R_1 + R_x(T_M))/(R_1 + R_A + R_x(T_M))$$

must be met. The derivative of resistance with respect to temperature is set equal to the desired slope m and yields a second equation $$m = -bR_A^2 R_x(T_M)/(T_M^2(R_x(T_M) + R_1 + R_A)^2)$$

which also must be met. A third condition is imposed by the linearity requirement, whereby $$R_1 + R_A = R_x(T_M)(b - 2T_M)/(b + 2T_M)$$

must additionally be met. As the values of mid-range temperature $T_M$, material process parameter b and mid-temperature sensor resistance $R_x(T_M)$ are all measurable, the three simultaneous equations yield the following values for resistances $R_1$, $R_A$ and $R_B$:

$$R_1 = R_x(T_M)((b - 2T_M)/(b + 2T_M)) - R_A.$$

$$R_A = (-4mT_M^2 bR_x(T_M)/(b + 2T_M)^2)^{\frac{1}{2}}$$

and $$R_B = R_M - ((R_A R_x(T_M) + R_1 R_A)/(R_1 + R_x(T_M) + R_A)).$$

In practice, we have found that by initially solving for the value of resistance $R_A$, and thence for the values of resistance $R_1$ and resistance $R_3$, a highly linear sensor network 30', utilizing a single non-linear resistance sensor 40, may be constructed having a desired slope m and a desired terminal resistance R at a specified value of sense parameter, e.g. temperature $T_M$, whereby all sensor networks utilizing a sensor having the same sensor constants (e.g. $R_x(T_M)$, a mid-range sensor resistance, and an exponential parameter b) are fully interchangeable with one another.

Returning now to FIG. 5, the multi-sensor network 30 does not have, unlike the single-sensor network 30' of FIG. 6a, a closed-form solution giving formulae for finding the value of each of resistances $R_1$-$R_n$, $R_A$ and $R_B$ only in terms of known sensor parameters and previously calculated resistance values. However, sensor network 30' is describable by a set of simultaneous equations which must be met simultaneously for full linearity, slope and point resistance requirements. These simultaneous equations, each in terms of a plurality of the (n+2) unknown resistances, can nevertheless be solved by minimizing the sum of the squares of the terminal resistance deviation, i.e. ($R_a - R_d$), where $R_a$ is actual resistance and $R_d$ is desired resistance, and using successive approximation methods. In particular, digital computing and associated techniques, such as the Newton-Raphson successive approximation technique, can be utilized to solve for all of the (n+2) unknown resistances. The sensor network 30 may then be fabricated by attaching the n different sensors to a substrate on which suitable resistance elements have been fabricated, e.g. by deposition of resistance films and connective interconnects, and with the values of resistances $R_1 - R_n$, $R_A$ and $R_B$ then being trimmed. This may be accomplished with a laser resistor trimmer controlled by a microcomputer and the like, wherein information concerning the resistance of each thermistor at two temperatures within the temperature range is entered into the computer and the value of b calculated from the logarithm of the ratio of the two resistances. Once the values of b is accurately known for each thermistor (and a point resistance value at at least one temperature being known therefrom) the microcomputer can calculate the value of fixed resistances and trim those resistances in each network. This procedure not only allows automatic fabrication of a sensor network in low cost manner, but further reduces the cost (as the widest tolerance sensors can be used), because all of the variable wide-tolerance sensors can be compensated by proper adjustment of one or more of the fixed resistances in the passive network. As the required fixed resistance trimming can be done without trimming the sensor, the sensor need not be held at any particular temperature during trimming or even be connected to the fixed resistance network at that time.

While several preferred embodiments of our novel interchangeable networks with non-linear sensors and our novel methods of producing such networks have been described in detail herein, many variations and modifications will now occur to those skilled in the art. It is our intent therefore to be limited only by the scope of the appending claims and not by the specific details described herein.

What is claimed is:

1. Apparatus containing only electrically passive elements and having an electrical parameter which is a selected one of terminal conductance and terminal resistance, said electrical parameter having a magnitude substantially linearly related to the magnitude of a sensed parameter, comprising:

N sensing means, where N is an integer greater than zero, for providing, between first and second terminals thereof, an electrical resistance of magnitude non-linearly related to the magnitude of the sensed parameter;

first and second network terminals; and a plurality (N+2) of fixed value electrical resistance elements; said plurality of resistance elements including N electrical resistance elements of fixed value, each of the fixed resistance elements electrically series connected to the first terminal of an associated one of said N sensing means to form a like number N of branch circuits; all of said N branch circuits being connected in electrical parallel;

said first network terminal being connected to the paralleled second terminals of all of said N sensing means;

the (N+1)-st fixed value resistance element being connected in electrical parallel with all of the N paralleled branch circuits; and the (N+2)-nd fixed value resistance element being connected in electrical series between said second network terminal and the junction between said (N+1)-st fixed value resistance element and all of said N branch circuits;

the fixed resistance value of each of said (N+2) resistance elements being simultaneously selected to provide, between said first and second network terminals, both a desired value of said electrical parameter for a preselected value of sensed parameter, and also a substantially linear desired value of the rate of change of the magnitude of the electrical parameter for a linear change in the magnitude of said sensed parameter.

2. The apparatus as set forth in claim 1, wherein at least two sensing means are utilized, each in series with an associated one of a like number of fixed resistances to form one of a like number of branch circuits in parallel connection with said first fixed magnitude resistance element.

3. The apparatus as set forth in claim 2, wherein one of said series fixed resistance elements has a resistance value substantially equal to zero.

4. The apparatus as set forth in claim 3, wherein the terminal conductance is linearized and further comprising a voltage source of essentially fixed magnitude and connected between said first and second terminal means; the voltage appearing across said second fixed magnitude resistance-element being of magnitude less than the essentially fixed magnitude and having a highly linear relationship to the magnitude of the sensed parameter.

5. The apparatus as set forth in claim 1, wherein the sensed parameter is temperature and each of said at least one sensing means is a thermistor.

6. The apparatus as set forth in claim 1, wherein at least a portion of the apparatus is at a first physical location and the remainder of the apparatus is at another physical location remote from said first location.

7. Apparatus having an electrical parameter which is a selected one of terminal conductance and terminal resistance, said selected terminal having a magnitude substantially linearly related to the magnitude of a sensed parameter, comprising:

a single sensing means for providing, between first and second terminals thereof, an electrical resistance of magnitude non-linearly related to the magnitude of the sensed parameter; the single sensing means having a first resistance $R_x(P_M)$ at a sensed parameter value $P_M$ in the middle of a desired sensed parameter range and having a second resistance value $R_x(P_H)$ at a highest parameter value $P_H$ in the range;

a single electrical resistance element in electrical series connection to the first terminal of the sensing means and having a fixed resistance value $R_1$ given by $$R_1 = R_x(P_M)((P_M)(b-2P_M) - R_A;$$

a first network terminal connected to the second terminal of the sensing means;
a second network terminal;
a first fixed magnitude resistance element connected in electrical parallel with the series-connected sensing means and series resistance element and having a resistance value $R_A$ given by $$R_A = (-4mP_M^2 b R_x(P_M)/(b+2P_M)^2)^{\frac{1}{2}}$$

where m is the preselected slope of the desired substantially linear resistance change with change in measured parameter appearing between said first and second terminal means and b is a material property constant given by $$b = (1/P_M - 1/P_H)^{-1} \ln(R_x(P_M)/R_x(P_H)); \text{ and}$$

a second fixed magnitude resistance element connected in electrical series between the second network terminal and the junction between the fixed magnitude resistance element and the series-connected sensing means and resistance element and having a resistance value $R_B$ given by $$R_B = R_x(P_M) - ((R_A R_x(P_M) + R_1 R_A)/(R_1 + R_x(P_M) - /R_A)).$$

8. The apparatus as set forth in claim 7, wherein in the sensed parameter is temperature and said sensing means is a thermistor.

9. The apparatus as set forth in claim 7, wherein at least a portion of the apparatus is at a first physical location and the remainder of the apparatus is at another physical location remote from said first location.

10. A method for providing a network having an electrical parameter which is a selected one of a terminal conductance and terminal resistance, said selected parameter having a magnitude substantially linearly related to the magnitude of a sensed parameter, comprising the steps of:

(a) providing at least one sensing means having a pair of terminals with an electrical resistance therebetween having a magnitude non-linearly related to the magnitude of the sensed parameter; each sensing means having a known resistance at a known value of sensed parameters and a known material property constant;

(b) connecting a resistance of fixed magnitude in electrical series with each of said at least one sensing means to form a like number of branch circuits;

(c) providing first and second network terminals;

(d) connecting a first resistance element of fixed magnitude in electrical parallel connection with all of said branch circuits;

(e) connecting a first lead of each of said paralleled branch circuits and said first resistance element to said first network terminal;

(f) connecting a second resistance element of fixed magnitude in series with the paralleled first resistance element and branch circuit combination;

(g) connecting the remaining end of said second resistance element to said second network terminal; and (h) adjusting the magnitude of said series, first and second resistance elements to simultaneously provide a desired value of said selected electrical parameter between said first and second network terminals, and a desired, substantially linear value of slope of said selected electrical parameter between the first and second network terminals for a linear change in the magnitude of the sensed parameter.

11. The method of claim 10, wherein step (h) includes the step of adjusting the magnitudes of the series, first and second resistance elements to minimize the sum of the squares of the difference between actual value of said selected electrical parameter between the network terminals at any sensed parameter magnitude and the desired value of said selected electrical parameter between the terminals for that sensed parameter magnitude for a essentially linear relationship between sensed parameter magnitude and said selected electrical parameter.

* * * * *